United States Patent
Hernandez Gutierrez et al.

(10) Patent No.: US 10,389,842 B2
(45) Date of Patent: Aug. 20, 2019

(54) MOBILE DEVICE CACHE UPDATING

(71) Applicant: INTERNATIONAL BUSINESS MACHINES CORPORATION, Armonk, NY (US)

(72) Inventors: Joel Hernandez Gutierrez, Zapopan (MX); David Jaramillo, Lake Worth, FL (US); Charisse Lu, Tarrytown, NJ (US); Richard J. Newhook, West Chester, PA (US); Janet Rivas Mendoza, Mexico City (MX); Benito C. Rojas Mayorquin, Zapapon (MX)

(73) Assignee: International Business Machines Corporation, Armonk, NY (US)

( * ) Notice: Subject to any disclaimer, the term of this patent is extended or adjusted under 35 U.S.C. 154(b) by 468 days.

(21) Appl. No.: 14/858,515

(22) Filed: Sep. 18, 2015

(65) Prior Publication Data
US 2017/0085671 A1    Mar. 23, 2017

(51) Int. Cl.
*H04L 29/08* (2006.01)
*G06F 16/957* (2019.01)

(52) U.S. Cl.
CPC ...... *H04L 67/2852* (2013.01); *G06F 16/9574* (2019.01); *H04L 67/02* (2013.01); *H04L 67/1097* (2013.01)

(58) Field of Classification Search
CPC .................. H04L 67/2847; H04L 67/2857
See application file for complete search history.

(56) References Cited

U.S. PATENT DOCUMENTS

| | | | |
|---|---|---|---|
| 6,721,288 B1 * | 4/2004 | King | H04L 29/06 370/310 |
| 7,000,074 B2 | 2/2006 | Wootton | |
| 7,143,241 B2 | 11/2006 | Hull | |
| 8,560,562 B2 | 10/2013 | Kanefsky | |
| 8,788,458 B2 | 7/2014 | Waterman et al. | |
| 9,104,582 B1 * | 8/2015 | Mukundan | G06F 12/0893 |
| 9,514,089 B1 * | 12/2016 | Raj | H04L 67/06 |
| 2002/0078209 A1 * | 6/2002 | Peng | H04L 29/06 709/227 |

(Continued)

FOREIGN PATENT DOCUMENTS

| | | |
|---|---|---|
| EP | 1522031 | 10/2012 |
| EP | 2682877 | 8/2014 |

OTHER PUBLICATIONS

Cambazoglu et al; A Refreshing Perspective of Search Engine Caching; Proceedings of the 19th International Conference on World Wide Web; Apr. 26-30, 2010; pp. 181-190.

(Continued)

*Primary Examiner* — Joe Chacko
(74) *Attorney, Agent, or Firm* — Schmeiser, Olsen & Watts; Mark C. Vallone

(57) ABSTRACT

A method and system for automatically updating a cache is provided. The method includes receiving by a database server from a mobile device, a request for modifying data within the database server. A Web service retrieves the request. The data is determined to be currently available within the database server and the request is transmitted to an analytics component of the database server. The analytics component determines if the data should be updated for use in an additional mobile device.

11 Claims, 5 Drawing Sheets

(56) References Cited

U.S. PATENT DOCUMENTS

| | | | |
|---|---|---|---|
| 2006/0031520 A1* | 2/2006 | Bedekar | H04L 67/1027 709/227 |
| 2011/0040718 A1* | 2/2011 | Tendjoukian | H04L 67/2847 706/52 |
| 2011/0060807 A1* | 3/2011 | Martin | G06F 17/3087 709/217 |
| 2011/0197032 A1* | 8/2011 | Patey | G06F 17/30008 711/133 |
| 2013/0159274 A1 | 6/2013 | Silberstein et al. | |
| 2014/0006538 A1 | 1/2014 | Oikonomou | |
| 2014/0011538 A1 | 1/2014 | Mulcahy et al. | |
| 2014/0012799 A1* | 1/2014 | Eberlein | G06Q 10/10 707/603 |

OTHER PUBLICATIONS

Wikipedia; HTTP ETag; Retrieved from the Internet, URL http://en.wikipedia.org/wiki/HTTP_ETag; retrieved on May 6, 2015; 4 pages.

* cited by examiner

MOBILE DEVICE CACHE UPDATING

FIELD

The present invention relates generally to a method for automatically updating a mobile device cache and in particular to a method and associated system for automatically analyzing an availability of commonly used data and automatically updating a mobile device cache.

BACKGROUND

Client applications may require data to be downloaded from a network. Downloading data from a network requires a stable network connection. However, connectivity issues may prevent a user from connecting, via a stable network connection, to a network in order to download associated data for use in a client application. Accordingly, there exists a need in the art to overcome at least some of the deficiencies and limitations described herein above.

SUMMARY

A first aspect of the invention provides an analytical data cache updating method comprising: receiving, by a computer processor of a database server from a mobile device, a request for modifying data within the database server; retrieving, by the computer processor executing a Web service, the request; first determining, by the computer processor that the data is currently available within the database server; transmitting, by the computer processor, the request to an analytics component of the database server; and second determining, by the computer processor executing the analytics component, if the data should be updated for use in an additional mobile device.

A second aspect of the invention provides a database server comprising a computer processor coupled to a computer-readable memory unit, the memory unit comprising instructions that when executed by the computer processor implements an analytical data cache updating method comprising: receiving, by a computer processor of a database server from a mobile device, a request for modifying data within the database server; retrieving, by the computer processor executing a Web service, the request; first determining, by the computer processor that the data is currently available within the database server; transmitting, by the computer processor, the request to an analytics component of the database server; and second determining, by the computer processor executing the analytics component, if the data should be updated for use in an additional mobile device.

A third aspect of the invention provides a computer program product, comprising a computer readable hardware storage device storing a computer readable program code, the computer readable program code comprising an algorithm that when executed by a computer processor of a computing system implements an analytical data cache updating method, the method comprising: receiving, by a computer processor of a database server from a mobile device, a request for modifying data within the database server; retrieving, by the computer processor executing a Web service, the request; first determining, by the computer processor that the data is currently available within the database server; transmitting, by the computer processor, the request to an analytics component of the database server; and second determining, by the computer processor executing the analytics component, if the data should be updated for use in an additional mobile device.

The present invention advantageously provides a simple method and associated system capable of providing data for client applications.

DETAILED DESCRIPTION

Figure 1:
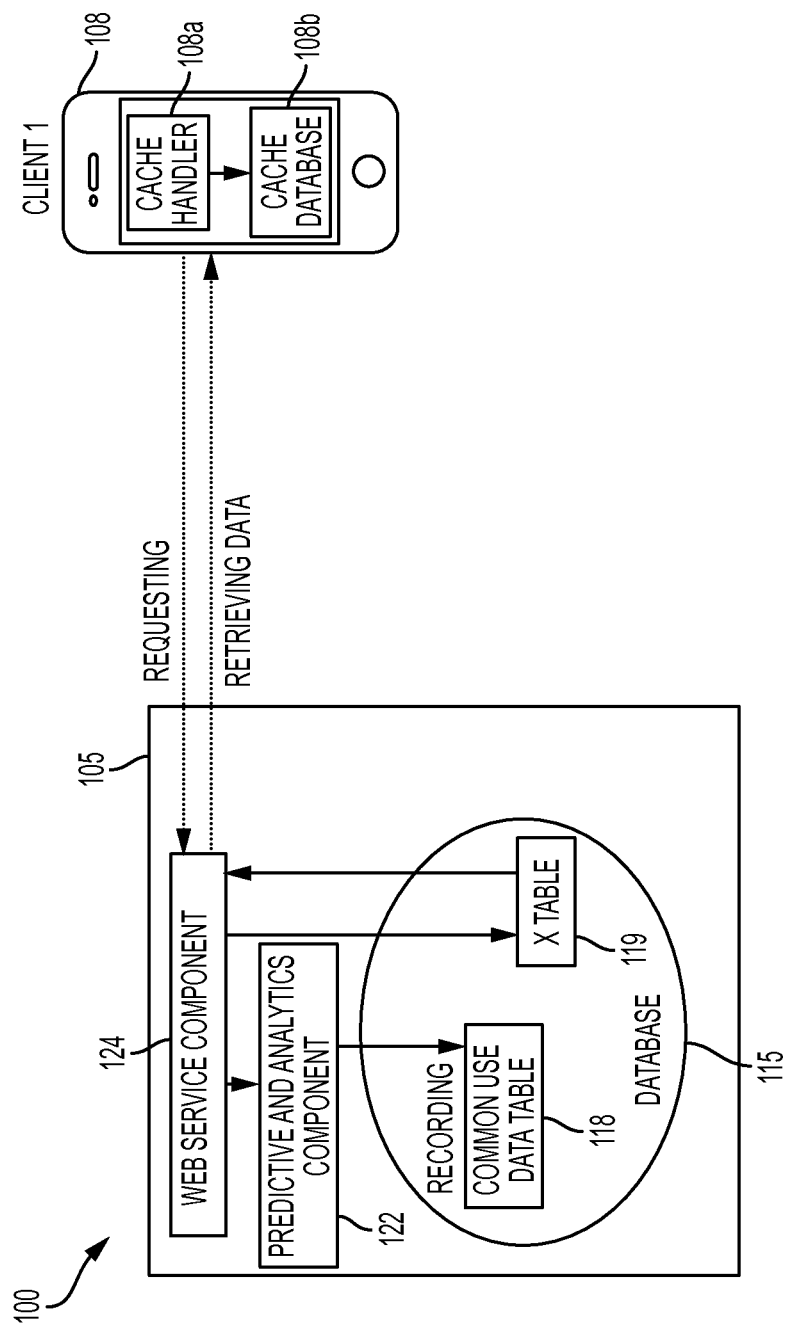
FIG. 1 illustrates a system for updating commonly used data caches within mobile devices, in accordance with embodiments of the present invention.

FIG. 1 illustrates a system 100 for updating commonly used data caches within mobile devices, in accordance with embodiments of the present invention. System 100 enables a system cache running in a background mode. System 100 executes a predictive analytic service that updates a database with respect to common user behavior such that the database automatically stores and refreshes associated information used to update commonly used data for mobile device usage. Persistent connection allow cache handler update common use data when it is updated by other client, then user has up to date information.

System 100 enables a method for updating a data cache in a mobile device by transmitting (in response to a mobile client on the mobile device) a request to retrieve information from a data source associated with a server. The request is received by a predictive analytics service and a data identifier within a common use data structure is recorded. Additionally, a response to the request is generated and transmitted to a cache handler component and associated data is stored within a data cache of the mobile client on the mobile device. A predictive analytics service additionally determines if updating the data source affects additional mobile devices associated with the server. For example, it may be determined if an updating process will affect the recorded common use data structure. A change tracker is enabled to perform a comparison between the cache of the mobile client and the data source associated with the server to identify updates or modifications to the mobile client. A response comprising an update to the mobile client may be transmitted to the cache handler component for storage of the update. The predictive analytics service may transmit the data in a background mode via a persistent connection to retrieve common use information before a user of the mobile device requests a display of the common use information.

System 100 of FIG. 1 may be used by a client requesting mobile device data. System 100 may include a specialized server 105 (e.g., specialized embedded hardware device)

communicatively connected to a mobile device 108. Mobile device 108 comprises a cache handler hardware component 108a and a cache database component 108b (e.g., specialized non-generic integrated circuits). Specialized server 105 comprises a database 115, a predictive and analytics component 122 (e.g., a specialized hardware component such as a specialized non-generic integrated circuit), and Web service component 124 (e.g., a specialized hardware component such as a specialized non-generic integrated circuit). Database 115 comprises a Common use data table 118 and an x table 119. Specialized server 105 may comprise a specialized hardware device comprising specialized (non-generic) hardware and circuitry (i.e., specialized discrete non-generic analog, digital, and logic based circuitry) for executing the process described with respect to FIGS. 1-4. The specialized discrete non-generic analog, digital, and logic based circuitry may include proprietary specially designed components (e.g., a specialized integrated circuit designed for only implementing an automated process for updating commonly used data caches within mobile devices). System 100 enables the following process associated with a client request for information recorded in a common use data table with respect to the aforementioned components:

A mobile client (of mobile device 108) transmits a request for retrieving information for use or display. In response, Web service component 124 retrieves the request and transmits associated data to predictive and analytics component 122 for recording. Predictive and analytics component 122 records an ID for the data and request in common use data table 118. The data is retrieved (by Web service component 124) from database 115 and a Web application (of Web service component 124) transmits a response to the mobile client of mobile device 108. The data is stored (by cache handler component 108a) in cache database component 108b.

Figure 2:
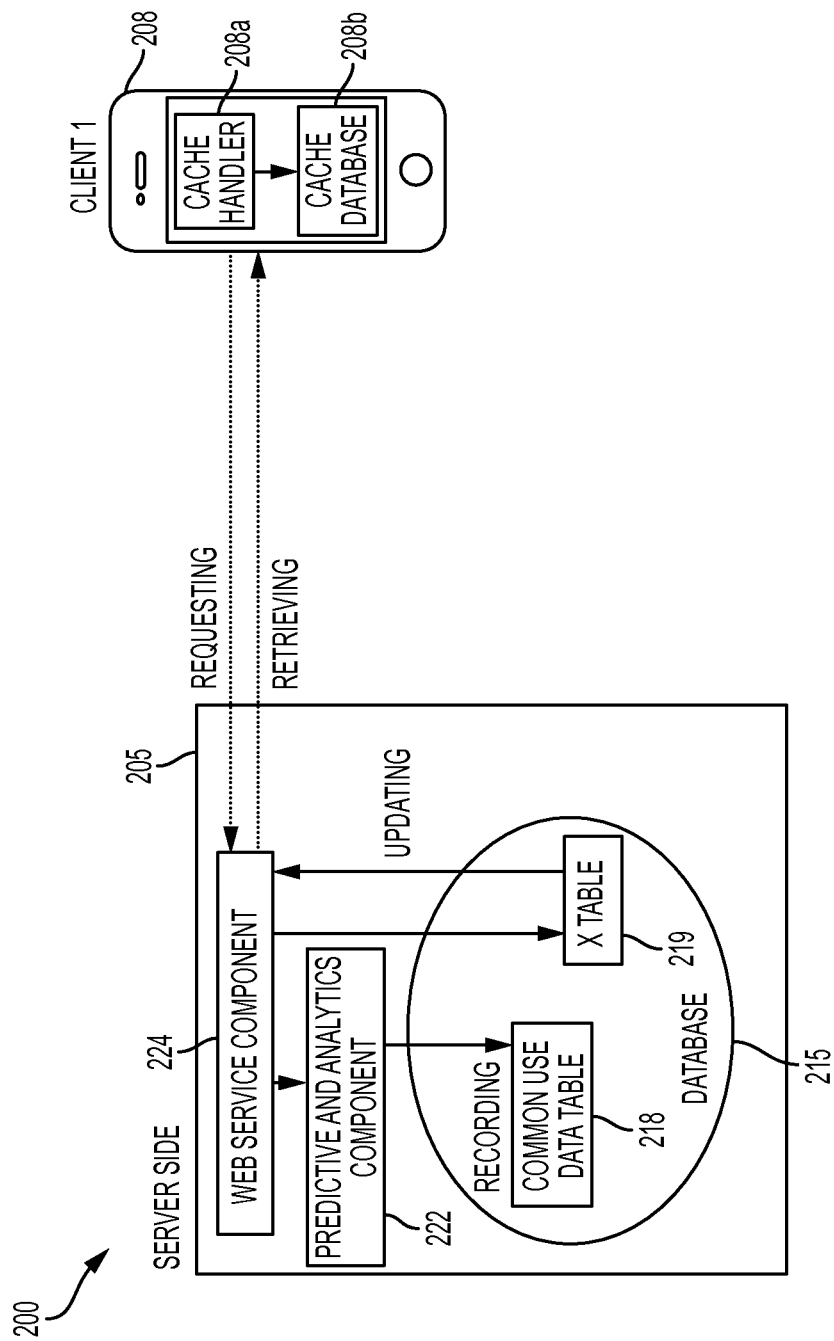
FIG. 2 illustrates a first alternative system to the system of FIG. 1 for updating commonly used data caches within mobile devices, in accordance with embodiments of the present invention.

FIG. 2 illustrates an alternative system 200 to system 100 of FIG. 1 for updating commonly used data caches within mobile devices, in accordance with embodiments of the present invention. System 200 may include a specialized server 205 (e.g., specialized embedded hardware device) communicatively connected to a mobile device 208. Mobile device 208 comprises a cache handler hardware component 208a and a cache database component 208b. Specialized server 205 comprises a database 215, a predictive and analytics component 222 (e.g., a specialized hardware component), and Web service component 224. Database 215 comprises a common use data table 218 and an x table 219. System 200 enables the following process associated with a client transmitting post request mobile device data such that modified information is recorded in a common use data table for further analysis:

A mobile client (of mobile device 208) transmits a request for modifying or adding new data in database 215. In response, Web service component 224 retrieves the request and transmits associated data to predictive and analytics component 222 for recording. Predictive and analytics component 222 records updated data and modifies common use data table 218. Additionally, it is determined if additional clients (for additional mobile devices) require the updated data. The updated data is posted to database 215 and the data is retrieved (by Web service component 224) from database 215 and a Web application (of Web service component 224) transmits a response to the mobile client of mobile device 208. The data is stored (by cache handler component 208a) in cache database component 208b and cache handler component 208a confirms the update to the data.

Figure 3:
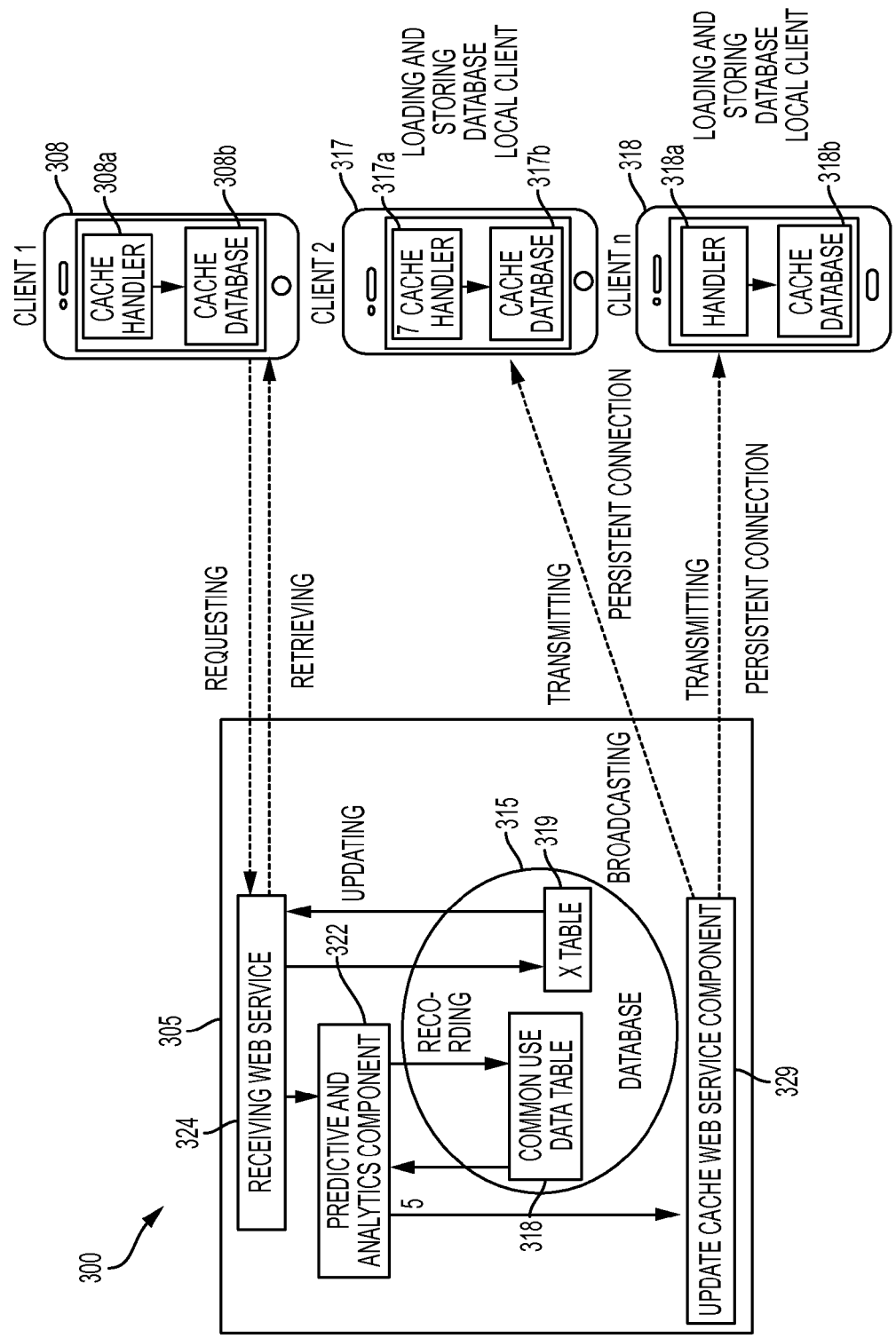
FIG. 3 illustrates a second alternative system to the system of FIG. 1 for updating commonly used data caches within mobile devices, in accordance with embodiments of the present invention.

FIG. 3 illustrates an alternative system 300 to system 100 of FIG. 1 for updating commonly used data caches within mobile devices, in accordance with embodiments of the present invention. System 300 may include a specialized server 305 (e.g., specialized embedded hardware device) communicatively connected to mobile devices 308, 317, and 318. Mobile device 308 comprises a cache handler hardware component 308a and a cache database component 308b. Mobile device 317 comprises a cache handler hardware component 317a and a cache database component 317b. Mobile device 318 comprises a cache handler hardware component 318a and a cache database component 318b. Specialized server 305 comprises a database 315, a predictive and analytics component 222 (e.g., a specialized hardware component), an update cache Web service component 329, and Web service component 224. Database 315 comprises a common use data table 318 and an x table 319. System 200 enables the following process associated with a client transmitting post request mobile device data to multiple mobile devices such that modified information is recorded in a common use data table for further analysis:

A mobile client (of mobile device 308, 317, and/or 318) transmits a request for modifying or adding new data in database 315. In response, Web service component 324 retrieves the request and transmits associated data to predictive and analytics component 322 for recording. Predictive and analytics component 322 records updated data and modifies common use data table 318. Additionally, it is determined if additional clients (for additional mobile devices 308, 317, and/or 308) require the updated data. If it is determined that additional clients (for additional mobile devices 308, 317, and/or 308) require the updated data then the updated data is stored within cache database 308b, 317b, and/or 318b and predictive and analytics component 322 transmits an update cache request to update cache Web service component 329. In response, update cache Web service component 329 transmits the update cache request via a persistent connection to client 1, client 2, and client 3 of mobile devices 308, 317, and 318. Cache handler hardware components 308a, 317a, and 318a update associated cache databases 308b, 317b, and 318b and confirm the update. The updated data is posted to database 315 and a Web application (of Web service component 324) transmits a response to the mobile client of mobile device 308, 317, and/or 318. The data is stored in cache database component 308b, 317b, and/or 318b and a cache handler component confirms the update to the data.

Figure 4:
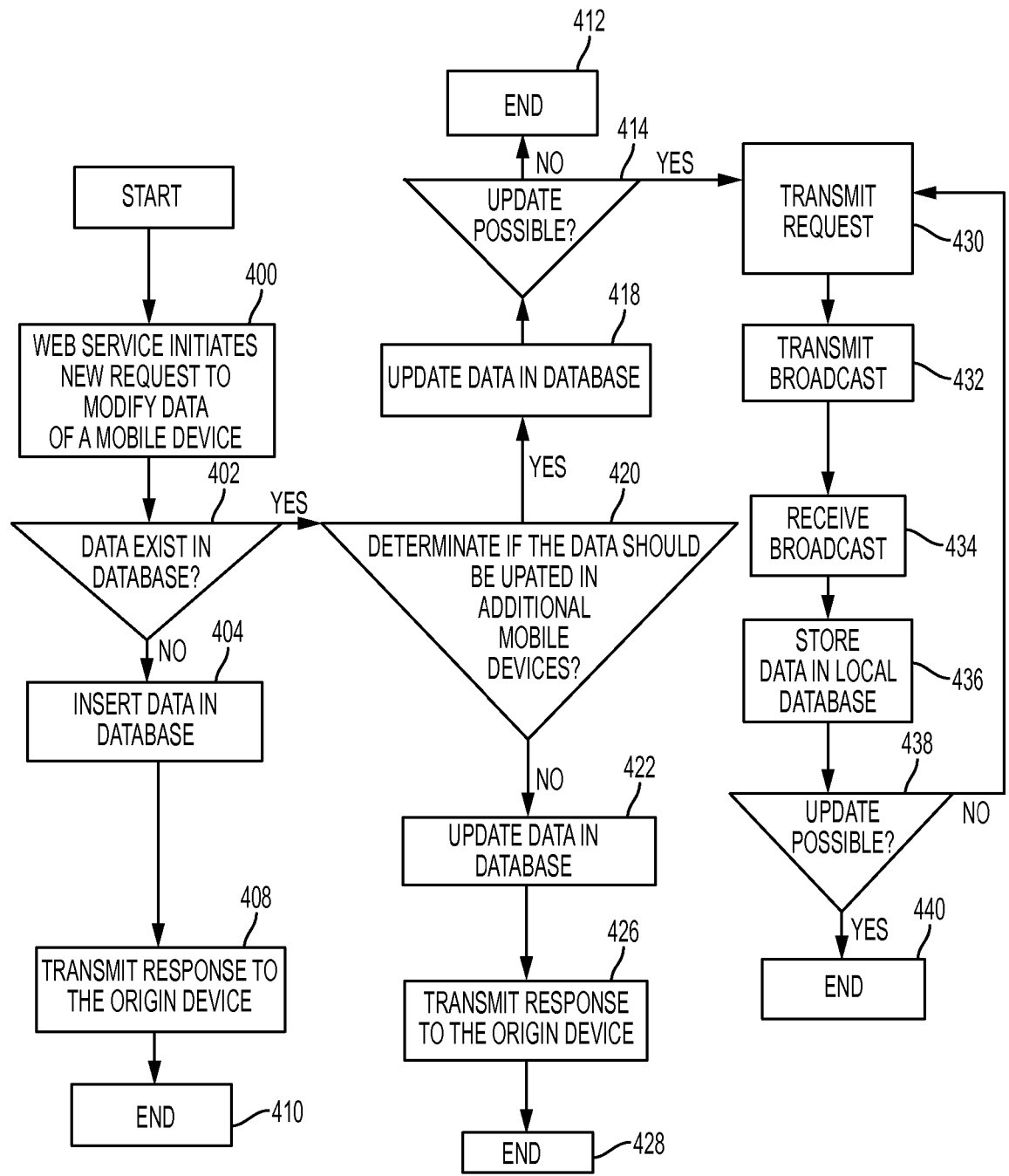
FIG. 4 illustrates an algorithm detailing a flow of steps enabled by the systems of FIGS. 1, 2, and 3 for updating commonly used data caches within mobile devices, in accordance with embodiments of the present invention.

FIG. 4 illustrates an algorithm detailing a flow of steps enabled by systems 100, 200, and 300 of FIGS. 1, 2, and 3 for updating commonly used data caches within mobile devices, in accordance with embodiments of the present invention. Each of the steps in the algorithm of FIG. 4 may be enabled and executed by a computer processor executing computer code. In step 400, a Web service initiates new request for modifying data of a mobile device. In step 402, it is determined if the data for modification already exists within a server database.

If in step 402, it is determined that the data for modification does not already exist within the server database then in step 404, the data is inserted into the server database and a commonly used table (in the database) is updated. In step 408, a response indicating that the data has been inserted into the database is transmitted to the requesting mobile device and the process is terminated in step 410.

If in step 402, it is determined that the data for modification does already exist within the server database then in step 420 it is determined if the data should be updated in additional mobile devices. If in step 420, it is determined that the data should not be updated in additional mobile devices then in step 422 the data is updated in the server database and the commonly used table (in the database) is updated. In step 426, a response indicating that the data has been updated in the database is transmitted to the requesting mobile device and the process is terminated in step 428. If in step 420, it is determined that the data should be updated in additional mobile devices then in step 418, an attempt to update the data and commonly used table in the server database is initiated. If the data fails to update in step 414, then the process is terminated in step 412. If the data is successfully updated in step 414, then in step 430, a predictive and analytics component (of the server) transmits a request to an update cache Web service component (of the server) so that all mobile device cache databases are broadcast. In step 432, the update cache Web service component transmits the broadcast to the mobile devices so that all mobile device cache databases are updated accordingly. In step 434, a cache handler component for each cache database stores the update in the cache databases. If the data fails to update in step 438, then the process is terminated in step 440. If the data is successfully updated in step 438, then step 430 is repeated.

Figure 5:
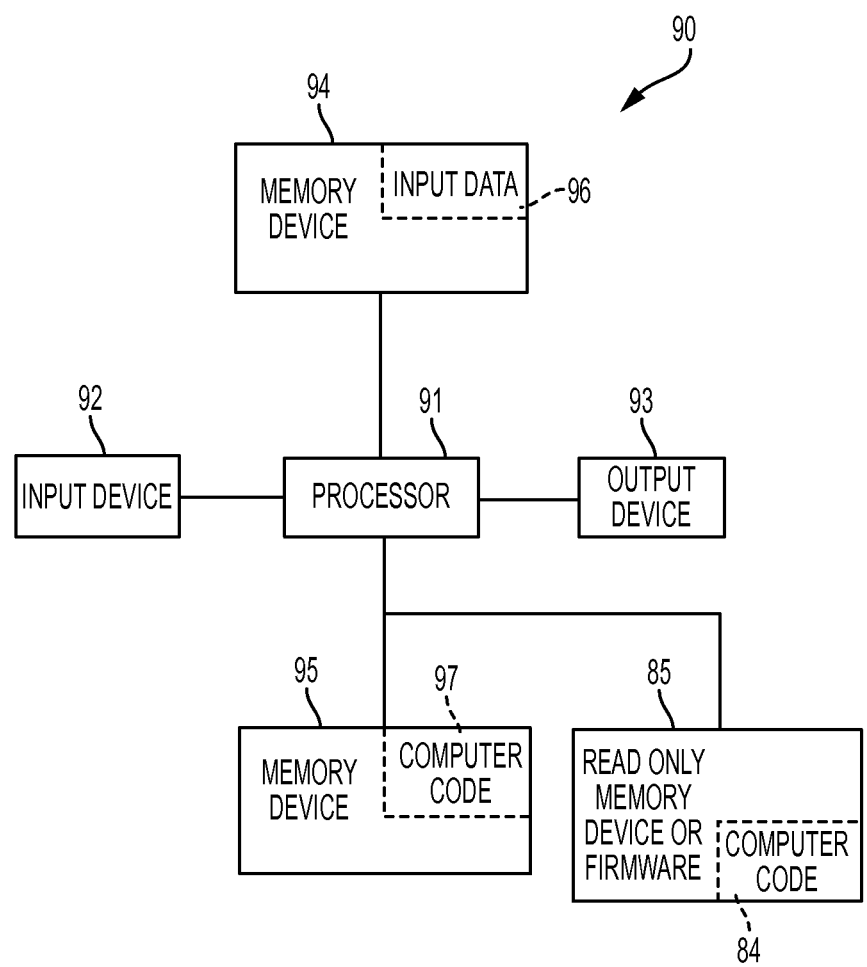
FIG. 5 illustrates a computer system used by or comprised by the system of FIG. 1 for enabling a process for updating commonly used data caches within mobile devices, in accordance with embodiments of the present invention.

FIG. 5 illustrates a computer system 90 (e.g., server 100 of FIG. 1) used by or comprised by the system of FIG. 1 for enabling a process for updating commonly used data in a data cache of mobile devices, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational activities to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 10 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIG. 4) for enabling a process for updating commonly used data in a data cache of mobile devices. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as read only memory device 85) may include the algorithm of FIG. 4 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 4) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 84 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to update commonly used data in a data cache of mobile devices. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for updating commonly used data in a data cache of mobile devices. In another embodiment, the invention provides a business method that performs the process activities of the invention on a subscription, advertising, and/or fee basis. That is, a service supplier, such as a Solution Integrator, could offer to enable a process for updating commonly used data in a data cache of mobile devices. In this case, the service supplier can create, maintain, support, etc. a computer infrastructure that performs the process activities of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An analytical data cache updating method comprising:
receiving, by a computer processor of a database server from a mobile device, a request for modifying data within and adding new data to a database internal to said database server;
retrieving, by said computer processor executing a Web service component comprising a specialized non-generic integrated circuit internal to said database server, said request;
first determining, by said computer processor that said data is currently available within said database of said database server;
transmitting, by said computer processor, said request to an analytics component internal to said database server;
comparing, by said computer executing a change tracker, said data currently available within said database server to current data located within a cache of an additional mobile device and a cache of a second additional mobile device;
second determining in response to results of said comparing, by said computer processor executing said analytics component, that said data should be updated for use in said additional mobile device and said second additional mobile device;

modifying, by said computer processor, said data resulting in modified data;

recording, by said computer processor executing said analytics component, results of said modifying within said database;

third determining in response to results of said comparing, by said computer processor executing said analytics component, that said new data should be added to said database for use in said additional mobile device and said second additional mobile device;

recording, by said computer processor executing said analytics component, an ID for said modified data, said new data, and said request;

modifying, by said computer processor, a commonly used data table, within said database, with said ID and descriptions of said modified data and said new data;

first determining, by said processor, that said request requires a persistent network connection for transmission;

determining in response to results of said first determining, by said computer processor based on execution of a cache Web service component, a persistent connection between said cache Web service component, said mobile device, said second additional mobile device, and said additional mobile device;

transmitting, by said computer processor executing said analytics component in a background mode, said request, via said persistent connection between said cache Web service component, said mobile device, said second additional mobile device, and said additional mobile device, for generating a broadcast specifying an update with respect to said modified data and said new data, wherein said broadcast, said new data, and said modified data is received by a first cache handler component internal to said additional mobile device and a second cache handler component internal to said second additional mobile device, wherein said first cache handler component updates a cache database internal to said additional mobile device, wherein said second cache handler component updates a second cache database internal to said second additional mobile device, and wherein said cache Web service component is internal to said database server;

storing, by said computer processor executing said first cache handler component and said second cache handler component, said modified data and said new data, retrieved from said cache database internal to said additional mobile device, within said database; and confirming, by said computer processor executing said first cache handler component and said second cache handler component, said update.

2. The method of claim 1, wherein said modified data is generated based on analysis of common behavior of said user.

3. The method of claim 1, wherein said request for modifying said data comprises a request for adding new data to said data.

4. The method of claim 1, wherein said request for modifying said data comprises a request for replacing said data with new data.

5. The method of claim 1, further comprising:

providing at least one support service for at least one of creating, integrating, hosting, maintaining, and deploying computer-readable code in the computing system, said code being executed by the computer processor to implement: said retrieving, said first determining, said transmitting, and said second determining.

6. A database server comprising a computer processor coupled to a computer-readable memory unit, said memory unit comprising instructions that when executed by the computer processor implements an analytical data cache updating method comprising:

receiving, by a computer processor of a database server from a mobile device, a request for modifying data within and adding new data to a database internal to said database server;

retrieving, by said computer processor executing a Web service component comprising a specialized non-generic integrated circuit internal to said database server, said request;

first determining, by said computer processor that said data is currently available within said database of said database server;

transmitting, by said computer processor, said request to an analytics component internal to said database server;

comparing, by said computer executing a change tracker, said data currently available within said database server to current data located within a cache of an additional mobile device and a cache of a second additional mobile device;

second determining in response to results of said comparing, by said computer processor executing said analytics component, that said data should be updated for use in said additional mobile device and said second additional mobile device;

modifying, by said computer processor, said data resulting in modified data;

recording, by said computer processor executing said analytics component, results of said modifying within said database;

third determining in response to results of said comparing, by said computer processor executing said analytics component, that said new data should be added to said database for use in said additional mobile device and said second additional mobile device;

recording, by said computer processor executing said analytics component, an ID for said modified data, said new data, and said request;

modifying, by said computer processor, a commonly used data table, within said database, with said ID and descriptions of said modified data and said new data;

first determining, by said processor, that said request requires a persistent network connection for transmission;

determining in response to results of said first determining, by said computer processor based on execution of a cache Web service component, a persistent connection between said cache Web service component, said mobile device, said second additional mobile device, and said additional mobile device;

transmitting, by said computer processor executing said analytics component in a background mode, said request, via said persistent connection between said cache Web service component, said mobile device, said second additional mobile device, and said additional mobile device, for generating a broadcast specifying an update with respect to said modified data and said new data, wherein said broadcast, said new data, and said modified data is received by a first cache handler component internal to said additional mobile device and a second cache handler component internal to said second additional mobile device, wherein said first cache handler component updates a cache database internal to said additional mobile device, wherein said second cache handler component updates a second cache database internal to said second additional mobile device, and wherein said cache Web service component is internal to said database server;

storing, by said computer processor executing said first cache handler component and said second cache handler component, said modified data and said new data, retrieved from said cache database internal to said additional mobile device, within said database; and confirming, by said computer processor executing said first cache handler component and said second cache handler component, said update.

7. The database server of claim 6, wherein said modified data is generated based on analysis of common behavior of said user.

8. The database server of claim 6, wherein said request for modifying said data comprises a request for adding new data to said data.

9. The database server of claim 6, wherein said request for modifying said data comprises a request for replacing said data with new data.

10. A computer program product, comprising a computer readable hardware storage device storing a computer readable program code, said computer readable program code comprising an algorithm that when executed by a computer processor of a computing system implements an analytical data cache updating method, said method comprising:

receiving, by a computer processor of a database server from a mobile device, a request for modifying data within and adding new data to a database internal to said database server;

retrieving, by said computer processor executing a Web service component comprising a specialized non-generic integrated circuit internal to said database server, said request;

first determining, by said computer processor that said data is currently available within said database of said database server;

transmitting, by said computer processor, said request to an analytics component internal to said database server;

comparing, by said computer executing a change tracker, said data currently available within said database server to current data located within a cache of an additional mobile device and a cache of a second additional mobile device;

second determining in response to results of said comparing, by said computer processor executing said analytics component, that said data should be updated for use in said additional mobile device and said second additional mobile device;

modifying, by said computer processor, said data resulting in modified data;

recording, by said computer processor executing said analytics component, results of said modifying within said database;

third determining in response to results of said comparing, by said computer processor executing said analytics component, that said new data should be added to said database for use in said additional mobile device and said second additional mobile device;

recording, by said computer processor executing said analytics component, an ID for said modified data, said new data, and said request;

modifying, by said computer processor, a commonly used data table, within said database, with said ID and descriptions of said modified data and said new data;

first determining, by said processor, that said request requires a persistent network connection for transmission;

determining in response to results of said first determining, by said computer processor based on execution of a cache Web service component, a persistent connection between said cache Web service component, said mobile device, said second additional mobile device, and said additional mobile device;

transmitting, by said computer processor executing said analytics component in a background mode, said request, via said persistent connection between said cache Web service component, said mobile device, said second additional mobile device, and said additional mobile device, for generating a broadcast specifying an update with respect to said modified data and said new data, wherein said broadcast, said new data, and said modified data is received by a first cache handler component internal to said additional mobile device and a second cache handler component internal to said second additional mobile device, wherein said first cache handler component updates a cache database internal to said additional mobile device, wherein said second cache handler component updates a second cache database internal to said second additional mobile device, and wherein said cache Web service component is internal to said database server;

storing, by said computer processor executing said first cache handler component and said second cache handler component, said modified data and said new data, retrieved from said cache database internal to said additional mobile device, within said database; and confirming, by said computer processor executing said first cache handler component and said second cache handler component, said update.

11. The computer program product of claim 10, wherein said modified data is generated based on analysis of common behavior of said user.

* * * * *